United States Patent [19]

Asprey

[11] Patent Number: 5,263,171
[45] Date of Patent: Nov. 16, 1993

[54] DEVICE FOR INTERFACING TWO KEYBOARDS TO ONE COMPUTER AND FOR AUTOMATICALLY CONNECTING THE ACTIVE KEYBOARD TO THE COMPUTER

[75] Inventor: Robert R. Asprey, Harvest, Ala.

[73] Assignee: Cybex Corporation, Huntsville, Ala.

[21] Appl. No.: 499,791

[22] Filed: Mar. 27, 1990

[51] Int. Cl.⁵ .................. G06F 13/14; G06F 13/366
[52] U.S. Cl. ........................... 395/800; 395/725;
340/825.5; 340/825.51; 370/85.2; 364/DIG. 1;
364/234; 364/234.4; 364/242.6; 364/242.93
[58] Field of Search ............. 395/800; 340/825.5,
340/825.51, 711; 370/85.2

[56] References Cited

U.S. PATENT DOCUMENTS

| | | | |
|---|---|---|---|
| 3,492,648 | 1/1970 | Olsen et al. | 340/711 |
| 3,934,230 | 1/1976 | Salle et al. | 395/275 |
| 4,227,072 | 10/1980 | Fancy et al. | 377/2 |
| 4,314,164 | 2/1982 | Tin et al. | 340/825.5 |
| 4,339,808 | 7/1982 | North | 340/825.5 |
| 4,423,384 | 12/1983 | DeBock | 328/152 |
| 4,872,004 | 10/1989 | Bahnick et al. | 395/275 |
| 4,903,200 | 2/1990 | Mook, Jr. | 364/405 |
| 4,924,220 | 5/1990 | Mihara et al. | 340/825.5 |
| 4,962,379 | 10/1990 | Yasuda et al. | 370/85.2 |
| 4,965,560 | 10/1990 | Riley | 340/711 |
| 5,136,694 | 8/1992 | Belt et al. | 395/275 |

Primary Examiner—Parshotam S. Lall
Assistant Examiner—Richard Lee Ellis
Attorney, Agent, or Firm—Phillips & Beumer

[57] ABSTRACT

This invention pertains to circuitry for automatically coupling up to four keyboards to a single keyboard port of a computer. Switching is accomplished by sensing a clock pulse appearing on one of the keyboard clock pulse lines responsive to a keystroke appearing on one of the keyboards. The clock pulse is applied either to a set input or a reset input of a latch, depending from which of keyboard clock pulses lines the pulse originated. The set or reset condition of the latch evokes a selected voltage potential on the output of the latch, which biases "on" bi-directional switches, coupling one of the keyboards to the computer.

10 Claims, 2 Drawing Sheets

DEVICE FOR INTERFACING TWO KEYBOARDS TO ONE COMPUTER AND FOR AUTOMATICALLY CONNECTING THE ACTIVE KEYBOARD TO THE COMPUTER

TECHNICAL FIELD

This invention relates to automatic switching circuitry for coupling one of a maximum of four keyboards to a single keyboard port of a computer. The switching is responsive to the first keystroke on one of the keyboards, with control of that keyboard over the computer being maintained until a keystroke is made on a different keyboard of the system.

BACKGROUND OF THE INVENTION

In many business environments where small computers (PCs), particularly IBM ™ compatible, are used to simplify, catalog, or maintain day-to-day operations, inventories, or correspondence, it is often desirable to have a pair of terminals, or keyboard-monitor combinations, remotely located from each other and which operate a single program in the computer in an either-/or use mode. Examples of such situations are boss-secretary environments, lab-office environments, and clerical sales-accounting environments. In the past, cable extension systems for remotely locating a terminal more than a few feet from a computer have generally been unsuccessful because of reliability problems and high cost; but with the advent of applicant's extension system, the subject of U.S. Pat. No. 4,885,718 and application Ser. Nos. 07/447,010 now U.S. Pat. No. 5,193,200 and 07/488,710, extended shared systems have become feasible.

In such a system, a shared system, the computer operates a single program such as a word processing program or an accounting program while either of the two users manipulate data in the single program on two separate terminals, possibly located in different offices, with the computer being generally located between them. In this situation, it is particularly convenient for a supervisor to be able to observe that a trainee is doing on the computer and to correct mistakes or instruct the trainee; or where up to four people may work on separate terminals on a common spreadsheet or document, sharing the work or any number of like situations. To the computer, it appears that there is only a single user inputting data on a single keyboard via a single, standard keyboard port. This system is contrasted to multi-user systems, which are generally out of the price range of many small businesses and which are capable of accommodating a plurality of simultaneous users.

Obviously, the problem with such a shared system lies in switching from one keyboard to the other when one user takes control of the computer from the other. Attempts applicant is aware of by others to achieve this switching involve the use, in one instance, of a double pole, double throw switch connected to switch one or the other keyboard inputs to the computer. Of course, it is cumbersome and inconvenient for users to be constantly operating a switch in order to use a keyboard, particularly if the switch is not conveniently located to both. In another effort, it was necessary for a user to press a button to switch the desired keyboard on-line with the computer, which simultaneously activated a timing circuit that, after detecting a set time period of inactivity on the keyboard, would disconnect the keyboard from the computer. This required the user to again press the button to regain control of the computer. This is obviously an aggravating and inconvenient situation, i.e., to be constantly required to press a button when lapses of activity on the keyboard occur.

In yet another system, the applicant devised a digital circuit which detected a keyboard clock pulse occurring upon a keystroke on one of the keyboards and switched control of the computer to that keyboard responsive to this first key stroke. This circuit utilized TTL buffers to amplify data levels and clock pulses travelling in both directions between the computer and the keyboards which generated positive feedback, which resulted in instability and oscillations. This system was actually built and sold beginning Nov. 19, 1987. While this system was an improvement inasmuch as control was automatically shifted responsive to the first keystroke, the system abounded with problems. It tended to become unstable with only minor accumulations of dust or dirt, requiring that it be kept immaculately clean. Also, it was not compatible with certain keyboards with which it would inexplicably go into uncontrolled oscillations, occasionally crashing the entire system. Even with keyboards with which it was supposed to be compatible, it would occasionally uncotrollably oscillate which, on occasion, would produce deliterious effects on software. It is believed that this design concept of utilizing TTL buffers with resulting feedback is generally unsound, which can cause lock-up conditions in the computer, uncontrolled oscillations, and a plethora of problems.

To overcome these problems, and as objects of the present invention, applicant has devised circuitry which is economical and simple in construction and which also automatically switches control of a computer to a selected keyboard upon which a keystroke occurs and thereafter maintains that keyboard as the active keyboard. In order for the other shared keyboard to be used, all that is required is for a keystroke to be made on it. It has been found during testing that applicant's circuitry shifts control of the computer between keyboards fast enough to allow simultaneous typing on both keyboards and, although this is not the normal contemplated use, illustrates high reliability, efficiency, and stability of the circuitry of the present invention.

SUMMARY OF THE INVENTION

In accordance with this invention, circuitry is disclosed which automatically switches control of a computer to one of a pair of keyboards responsive to a keystroke made on one of the keyboards. This is achieved by sensing the clock pulse concurrent with the keystroke on the selected keyboard and provides a voltage level indicative of the keyboard whence the clock pulse came from and applying this selected voltage level to a control line. A plurality of switches are coupled to the control line and to the keyboards and the computer and are disposed to discriminate the two selected voltage levels and switch the selected keyboard such that data flows between it and the computer, while blocking data flow between the non-selected keyboard and the computer.

DESCRIPTION OF THE PREFERRED EMBODIMENT

Figure 1:
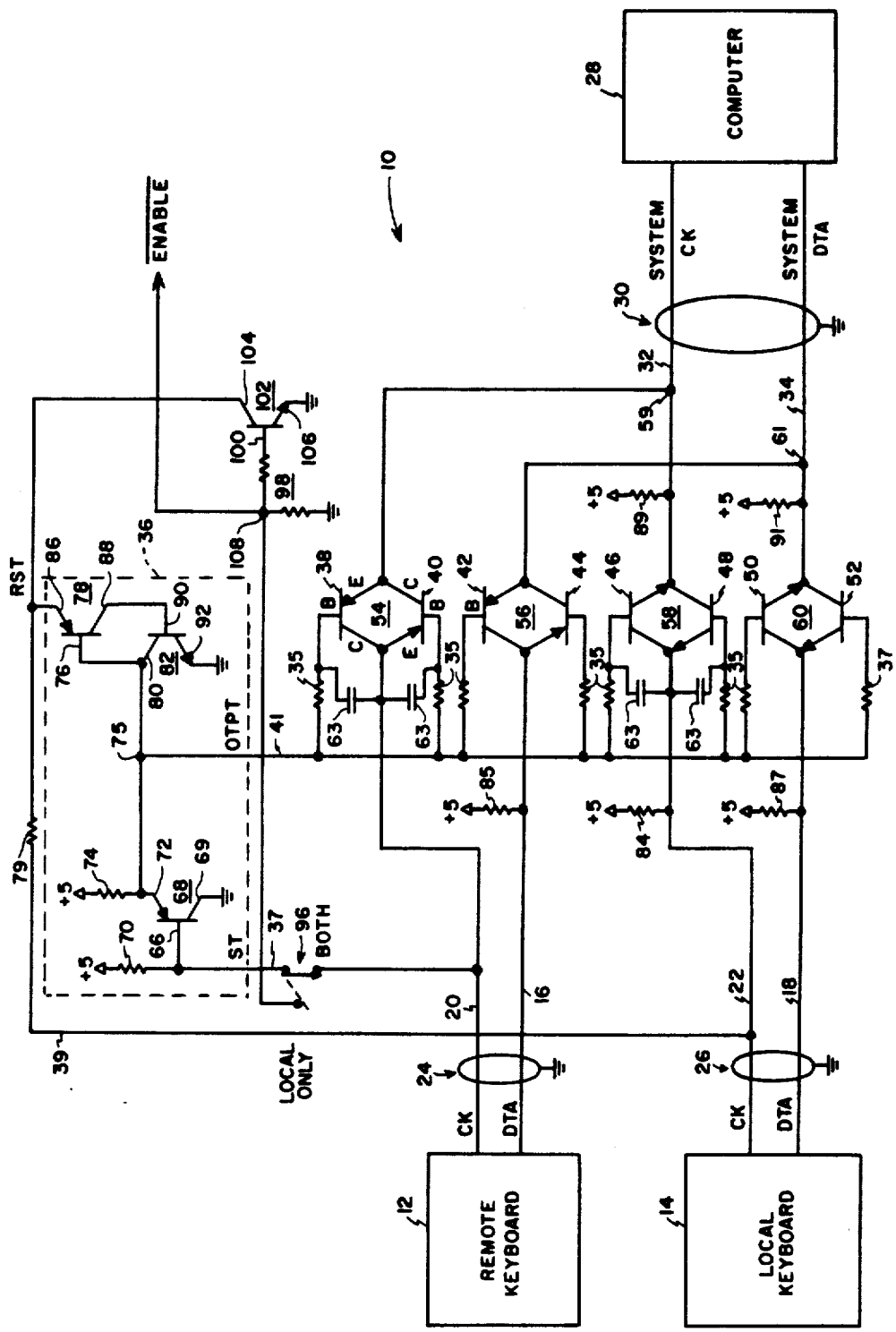
FIG. 1 is a schematic diagram of circuitry of the present invention.
Figure 2:
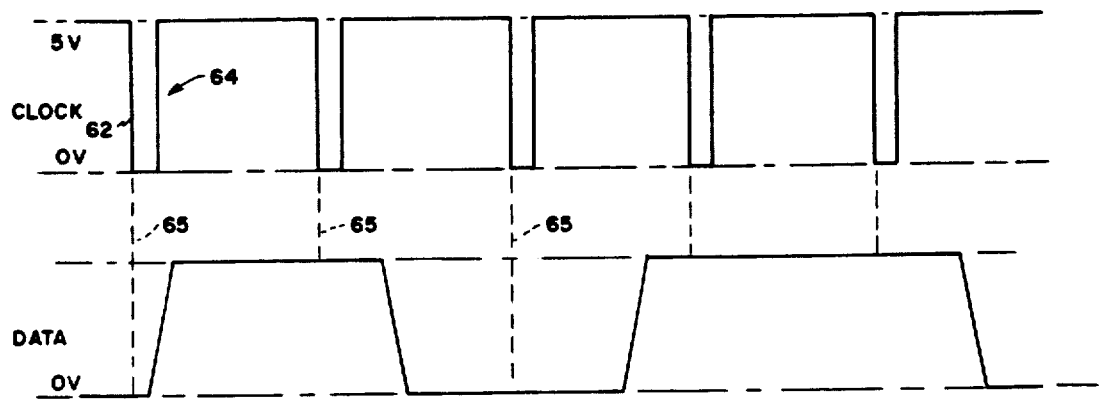
FIG. 2 illustrate waveforms representative of clock and data voltage levels of the present invention.
Figure 3A:
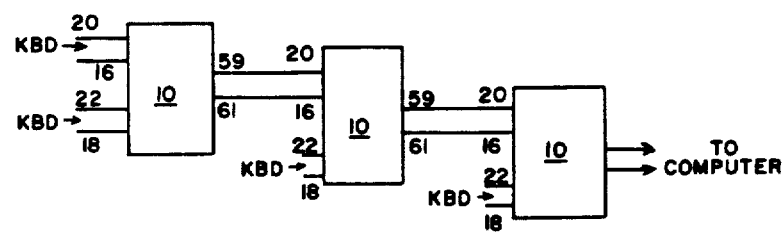
FIGS. 3a and 3b illustrate duplicates of circuit 10 and connections thereof for connecting up to four keyboards to common input lines of a computer.
Figure 3B:
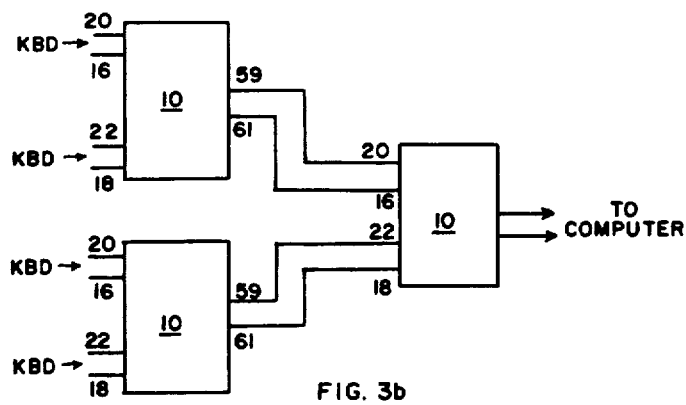

Referring to FIG. 1, circuitry 10 is shown for allowing shared usage of a pair of computer keyboards, a remote keyboard 12 and a local keyboard 14 which utilize a synchronous serial data transmission scheme. Video from the computer appears on both of the monitors (not shown) associated with keyboards 12 and 14 simultaneously so that both users may share use of the computer as long as their keystrokes do not fall within 10 milliseconds of each other, as will be explained. In general, when a keystroke occurs on one of keyboards 12 or 14, that keyboard provides a data stream segment consisting of a series of data levels along its respective data line 16 or 18. Inside the keyboard, the data signal initiates the output of a keyboard clock signal along the respective keyboard clock signal line 20 or 22, which is output closely coincident with the output of the data signal, typically within 500 nanoseconds. The clock signal possesses very fast negative transition times, as most computers of this type utilize negative edge triggered logic, and functions to instruct the computer when to sample the state of the data line, as illustrated in FIG. 2. As shown, dashed line 65 illustrates sampling points timed by leading edges 62 of clock pulses 64, the sampling being done by the computer or keyboard, depending upon the direction of data flow. These keyboard outputs are coupled to circuitry 10 via shielded keyboard cables 24 and 26 from keyboards 12 and 14, respectively, and are automatically switched by circuitry 10 depending on the keyboard being used, to computer 28 via a shielded single cable 30 housing a single clock line 32 and a single data line 34. For some computer systems, the computer may be programmed to control particular functions of the keyboard in use, such as status indicator lights and certain software driven keyboard functions. For this mode of operation, it is necessary for the data line to be a bi-directional signal line to allow the computer to send data to the keyboard. Additionally, when the computer sends data to the keyboard, it uses the keyboard clock to time the transmission and signals the keyboard to generate a clock signal by pulling both the data line and keyboard clock line "low" simultaneously. Accordingly, the keyboard clock line must also be a bi-directional line. Additionally, and as a further feature of the present invention, means are provided in circuitry 10 to "lock out" the remote keyboard, limiting operation to the local keyboard only. Further, one or two more keyboards may be added, up to a total of four keyboards, by utilizing a duplicate of circuitry 10 and coupling a keyboard input at lines 20 and 16 or lines 22 and 18 of the duplicate circuit 10 as shown in FIGS. 3a and 3b.

Operation of circuitry 10 is dependent upon sensing the clock signal output from the keyboard being used and setting or resetting a switching and latch circuit 36 (dashed lines) depending on which keyboard is in use. Latch 36 serves to sense clock pulses from either of keyboards 12 or 14 and, depending on the state of latch circuit 36, provides a voltage level on a common control line 41, which forward biases the appropriate ones of switching transistors 38-52 making up transistors pairs 54-60 which function as bi-directional switches to allow bi-directional and unidirectional communications between computer 28 and the active keyboard.

Circuitry 10 may be adapted to pass asynchronous data signals from keyboards utilizing asynchronous transmission schemes by simply applying the asynchronous signals to the clock lines.

Discussion of the construction of circuitry 10 will begin with latch circuit 36 (dashed lines) which has a "set" input 37 coupled via local/both switch 96 to keyboard clock line 20 of keyboard 12. "Set" input 37 is applied to base 66 of PNP transistor 68, with a pull-up resistor 70 providing +5 volts to base 66, holding transistor 68 normally "off." A second pull-up resistor 74 is coupled to emitter 72 of transistor 68, with collector 69 being coupled to ground. Configured as such, a "low" clock pulse applied to base 66 from keyboard 12 will sink the +5 volts provided by resistor 70 to near zero, driving transistor 68 into conduction. The resultant current drain from emitter 72 drops voltage at emitter 72 to near zero. Emitter 72 is connected at terminal 75 to common control line 41 and to a base-collector junction of transistors 78 and 82, which are coupled base-to-collector as shown. Emitter 92 of transistor 82 is coupled to ground, and emitter 86 of transistor 78 is coupled via a current limiting resistor 79 and "reset" line 39 to keyboard clock line 22 of keyboard 14. Resistor 79 prevents clock line 22 from being pulled too low when transistors 78 and 82 are latched; without it, there would appear almost a virtual short to ground from clock line 22 through transistors 78 and 82. A pull-up resistor 84 coupled between +5 volts and keyboard clock line 22 provides +5 volts to emitter 86 of transistor 78 through resistor 79. Thus, the aforementioned voltage drop at emitter 72 of transistor 68, when applied to base 76 and collector 80 of transistors 78 and 82, drives transistor 78 into conduction and provides +5 volts from resistor 79 to base 90 of transistor 82, saturating transistor 82. Thereafter, transistors 78 and 82 are in a latched mode, with current flow from pull-up resistor 74 through collector 80 and emitter 92 of transistor 82 to ground, holding base 76 of transistor 78 near zero volts, saturating transistor 78 and continuously applying bias potential via resistor 79, emitter 86, and collector 88 of transistor 78 to base 90 of transistor 82. It is possible that latch 36 may be replaced by triacs, SCRs, or a conventional data latch such as a D-type latch, a set/reset flip-flop, or any equivalent thereof.

In this manner, latch 36 is set by the negative-going transition 62 (FIG. 2) of the first clock pulse 64 from keyboard 12 and reset by the first negative-going transition 62 of the first clock pulse 64 from keyboard 14.

Output line 41 from latch 36, upon which a low voltage (less than 0.5 volts) appears when latch 36 is set, and upon which approximately 4.5 volts appears when latch 36 is reset, is coupled via current limiting resistors 35 to bases B of transistors 38-52. As shown, transistors 38-52 are coupled as pairs, with the collector C of one being connected to the emitter E of the other, as illustrated by transistor pair 54. Importantly, transistors 38, 40, 42, and 44, making up transistor pairs 54 and 56, are PNP transistors, while transistors 46, 48, 50, and 52, making up transistor pairs 58 and 60, are NPN transistors. Transistor pairs 54-60 may be replaced by fast-actuating relays, field effect transistors, C-MOS switches, or other equivalent electronic switches. Connected as such, a positive bias voltage indicative of a reset state of latch 36 on common control line 41 will bias "on" transistor pairs 58 and 60 in approximately 20 nanoseconds, allowing data and clock pulses to simultaneously flow between keyboard 14 and computer 28 while switching "off" transistor pairs 54 and 56. Conversely, with a "low" applied to common control line 41, indicative of a set state of latch 36, will bias "on" transistor pairs 54 and 56, allowing data and clock pulses to simultaneously flow between keyboard 12 and computer 28 while biasing "off" transistor pairs 58 and 60. The left junction of transistor pair 54 and 56 are coupled to keyboard data and clock lines 20 and 16, respectively, of keyboard 12, while the left junction of transistor pair 58 and 60 are coupled to keyboard clock and data lines 22 and 18, respectively, of keyboard 14. Clock lines 20 and 22 and data lines 16 and 18 are provided with pull-up resistors 70 and 84 and 16 and 18, respectively, which function to suppress noise on clock and data lines 20, 22, 16, and 18. These resistors may also be provided in the circuitry of keyboards 12 and 14. The right junction of transistor pair 54 and 58 are coupled to a common junction 59, which is the system clock input for computer 28, while the right junction of transistor pairs 56 and 60 are coupled to a common junction 61, the system data input to computer 28. Pull-up resistors 89 and 91 are included on system clock and data lines 32 and 34, as shown, for noise suppression and may be provided in the keyboard interface circuitry of computer 28. In the instance where particularly fast computers are being used in conjuction with circuitry 10, it may be necessary to include optional capacitors 63 having values of 0.1 microfarads or lower coupled as shown between output line 41 and the clock lines 20 and 22 of transistor pairs 54 and 58. Capacitors 63 each form an RC network with the associated one of resistors 37, which delays switching of clock pulse transistor pairs 54 and 58 to a conductive state. This allows data levels to stabilize at terminal 61 before being clocked into computer 28 by clock pulses at terminal 59.

Particulars of operation of circuitry 10 will begin by assuming that a user has just made a first keystroke of a procession of key strokes on the remote keyboard 12. Referring to the waveforms of FIG. 2, it is seen that upon occurrence of the keystroke, a data stream segment in the form of data levels is output from keyboard 12 along conductor 16 of keyboard cable 24 to switching transistor pair 56. Concurrent with, or slightly lagging a few nanoseconds behind setting of the first data level, is the first clock pulse applied to conductor 20 of cable 24. The clock pulses are typically less than 100 nanoseconds. The entire data segment, generally encoded to represent a numeral, letter, or symbol, consists of as many as 11 pulses and is, at most, approximately 10 milliseconds long. Thus, as long as keystrokes between keyboards 12 and 14 are 10 milliseconds or more apart, circuitry 10 will adequately switch between keyboards. In the rare event where two keystrokes on keyboards 12 and 14 fall within 10 milliseconds of each other, the computer rejects the data, and an indication of such rejection occurs, either as an audible tone or a visual indication on the monitors.

The falling edge 62 of the first clock pulse 64 (FIG. 2) initiated by a keystroke on the remote keyboard, with local/remote switch 96 (FIG. 1) in the "both" position, is applied to base 66 of transistor 68, the base also being connected to pull-up resistor 70 coupled to +5 volts. This negative-going transition causes voltage from pull-up resistor 70, which keeps transistor 68 "off," to be sunk in the keyboard circuitry, causing a "low" to be applied to base 66 of transistor 68, biasing it to a conductive state. This, in turn, causes +5 volts applied to emitter 72 via pull-up resistor 74 to fall to near zero volts, applying a "low" to base 76 of transistor 78 and collector 80 of transistor 82, transistors 78 and 82 being connected, as stated, base-to-collector. The "low" applied to base 76 of transistor 78 switches it to a conductive state, with current flowing from pull-up resistor 84 through resistor 79 and emitter 86 and collector 88 to base 90 of transistor 82. This current flow switches "on" transistor 82, causing current to flow from pull-up resistor 74 through collector 80 and emitter 92 of transistor 82 to ground, latching transistor 82 in an "on" state. Thereafter, transistor 82 ensures constant current flow through transistor 78, maintaining the latched state. Thus, transistors 78 and 82 will remain latched, or "on," until the voltage applied to emitter 86 of transistor 78 is removed.

Latching of transistors 78 and 82 as described applies the "low" felt at collector 80 via terminal 75 and common control line 41 to the bases of transistor pairs 54–60. As shown, these transistors are coupled in pairs, emitter to collector, for passing information in both directions, i.e., from computer 28 to keyboards 12 and 14, and vice versa. Moreover, transistors 38–44 of pairs 54 and 56 connected to the remote keyboard 12 are selected to be PNP transistors, while transistors 46–52 of pairs 58 and 60 connected to local keyboard 14 are selected to be NPN transistors. With this combination of biasing, it is readily seen that the "low" applied to the bases of transistor pairs 54–60 will bias transistors 38–44 of transistor pairs 54 and 56 to a conductive state, while biasing transistors 46–52 of transistor pairs 58 and 60 to a high impedance state. In this manner, when a keystroke occurs on a remote keyboard 12, transistors 78 and 82 are latched "on," applying a "low" to the bases of transistor pairs 54 and 56, switching them "on" and allowing data to flow from remote keyboard 12 to computer 28, and vice versa, while transistor pairs 58 and 60 are biased "off," blocking any flow of information to or from local keyboard 14.

In order to switch operation from remote keyboard 12 to local keyboard 14, all that is required is for a keystroke to be made on local keyboard 14. As earlier stated, upon the occurrence of a keystroke, the data stream segment on data line 18 is closely coincident with keyboard clock pulses occurring on clock pulse line 22. These clock pulses are applied to emitter 86 of transistor 78, with the first high-to-low transition thereof sinking current from pull-up transistor 84, causing voltage on clock line 22 to fall to near zero volts. This low voltage shuts off current flow to emitter 86 of transistor 78, causing it to turn "off" and assume a high impedance state, which in turn removes bias voltage from base 90 of its companion transistor 82, shutting it off and delatching transistors 78 and 82. When this occurs, voltage from pull-up resistor 74 to junction 75 rises to +5 volts, applying this voltage to the bases of transistor pairs 54–60. As is readily seen, this now forward biases transistor pairs 58 and 60 coupled to local keyboard 14 while reverse biasing transistor pairs 54 and 56 coupled to remote keyboard 12. This allows bi-directional communications to now occur between computer 28 and local keyboard 14.

In order to utilize the circuitry shown in the "local only" mode, single pole, double throw switch 96 is placed in the "local only" position (dotted lines). This disconnects the clock line from remote keyboard 12 to transistor 68, preventing clock pulses from remote keyboard 12 when a keystroke is made thereon from reaching transistor 68. Of course, with no negative-going transition applied to base 66 of transistor 68, transistor 68 will never be biased "on," which in turn holds latching transistors 78 and 82 reset or "off." However, if the "remote" keyboard was the last keyboard in use when "local only/latch" switch 96 was placed in the "local only" position, latch 36 will remain "set," i.e., remote keyboard 12 enabled until a keystroke is made on "local" keyboard 14, delatching transistor pairs 78 and 82 and resetting latch 36. In order to automatically reset latch 36, +5 volts from pull-up resistor 70 is applied via switch 96 and resistor network 98, which biases transistor 102. This switches transistor 102 "on"; and the ensuing current drain through collector 104 and emitter 106, coupled to ground, drops the potential at emitter 86 of transistor 78 to near zero volts, shutting it "off" and delatching transistors 78 and 82. In turn, this maintains +5 volts on bases of transistor pairs 58 and 60 which holds them in a conductive state, allowing data to flow from local keyboard 14 to computer 28, and vice versa. In effect, switching "on" of transistor 102 by placing switch 96 in the "local only" position emulates a keystroke or keyboard 14 which resets latch 36. Additionally, a video enable signal is picked off from terminal 108 of voltage divider 98 and used to disable the video signal applied to the video monitor (not shown) of remote keyboard 12. This signal indicates to another circuit (not shown) that video information to the remote monitor is to be suppressed. Thusly, the "local only" position of switch 96 switches control of computer 28 to local keyboard 14 and removes the video signal from the monitor of remote keyboard 12.

Having thus described the construction of my invention and the manner of its intended use, it is apparent that a number of incidental changes may be resorted to which clearly fall within the scope of the following appended claims, wherein I claim:

1. A keyboard switching system comprising:
    a first bidirectional keyboard of a type which generates first keyboard clock signals and first keyboard data signals upon occurrence of a keystroke, and further having a first keyboard clock signal terminal for passing said first keyboard clock signals to a computer and for receiving computer signals from a computer, and having a first keyboard data signal terminal for passing data signals to and from a computer;
    a second bidirectional keyboard of said type for generating second keyboard clock signals and second keyboard data signals and having a second keyboard clock signal terminal for passing said second keyboard clock signals to a computer and for receiving said computer signals from a computer, and having a second data signal terminal for passing data signals to and from a computer;
    keyboard clock signal sensing means coupled to said first and second keyboard clock signal terminals for discretely sensing said first keyboard clock signals and said second keyboard clock signals and providing either a first control signal responsive to sensed said first keyboard clock signals or a second control signal responsive to a sensed said second keyboard clock signal;
    a first bidirectional transistor switching means comprising bidirectional transistor structure and having a first terminal coupled to said first keyboard clock signal terminal, and having a second, switched terminal coupled to a computer and responsive to said first control signal, for coupling said first and second terminals through said bidirectional transistor structure, enabling bi-directional signal transmission;
    a second bidirectional transistor switching means comprising bidirectional transistor structure and having a first terminal coupled to said first keyboard data signal terminal, and having a second, switched terminal coupled to a computer and responsive to said first control signal, for coupling said last named first and second terminals through said last named bidirectional transistor structure, enabling bi-directional data transmission;
    a third bidirectional transistor switching means comprising bidirectional transistor structure and having a first terminal coupled to said second keyboard clock signal terminal, and having a second, switched terminal coupled to a computer and responsive to said second control signal, for coupling said last named first and second terminals through said last named bidirectional transistor structure, enabling bi-directional signal transmission; and
    a fourth bidirectional transistor switching means comprising bidirectional transistor structure and having a first terminal coupled to said second keyboard data signal terminal, and having a second, switched terminal coupled to a computer and responsive to said second control signal, for coupling said last named first and second terminals through said last named bidirectional transistor structure, enabling bi-directional data signal transmission.

2. A keyboard switching system as set forth in claim 1 wherein said first and second bidirectional transistor switching means each comprises a pair of PNP transistors coupled emitter-to-collector, with bases thereof being responsive to said first control signal.

3. A keyboard switching system as set forth in claim 2 wherein said third and fourth bidirectional transistor switching means each comprises a pair of NPN transistors coupled emitter-to-collector, with bases thereof being responsive to said second control signal.

4. A keyboard switching system as set forth in claim 3 wherein said keyboard clock signal sensing means includes a latch having a set input, a reset input, and an output, said set input being responsive to said first keyboard clock signal and said reset input responsive to said second keyboard clock signal, and said output providing said first and second control signals to the bases of said NPN and PNP transistors.

5. A keyboard switching system as set forth in claim 4 comprising fifth switching means having a first terminal coupled to a reset potential, and a second, switched terminal coupled to said reset input of said latch, whereby said reset potential is coupled to said reset input, generating said second control signal and applying said second control signal to said third and fourth switching means, enabling said second keyboard for bi-directional signal transmission with said computer.

6. A keyboard switching system comprising:
    a first bidirectional keyboard of a type which generates, upon occurrence of a keystroke made thereon, first keyboard clock signals and first keyboard data signals, each being a first keyboard signal, and further having a first keyboard clock signal terminal for passing said first keyboard clock signals to a computer and for receiving computer signals from a computer, and having a first keyboard data signal terminal for passing data signals to and from a computer;

a second bidirectional keyboard of said type for generating second keyboard clock signals and second keyboard data signals, each being second keyboard signals, and having a second keyboard clock signal terminal for passing said second keyboard clock signals to a computer and having a second data signal terminal for passing data to and from a computer;

keyboard signal sensing means for discretely sensing said first keyboard signals and second keyboard signals and providing either a first control signal responsive to sensed said first keyboard signals or a second control signal responsive to sensed said second keyboard signals;

a first bidirectional transistor switching means comprising bidirectional transistor structure and having a first terminal coupled to said first keyboard clock signal terminal, and having a second, switched terminal coupled to a computer and responsive to said first control signal, for coupling said last named first and second terminals through said last named bidirectional transistor structure, enabling bi-directional signal transmission;

a second bidirectional transistor switching means comprising bidirectional transistor structure and having a first terminal coupled to said first keyboard data signal terminal, and having a second, switched terminal coupled to a computer and responsive to said first control signal, for coupling said last named first and second terminals through said last named bidirectional transistor structure, enabling bi-directional data transmission;

a third bidirectional transistor switching means comprising bidirectional transistor structure and having a first terminal coupled to said second keyboard clock signal terminal, and having a second, switched terminal coupled to a computer and responsive to said second control signal, for coupling said last named first and second terminals through said last named bidirectional transistor structure, enabling bi-directional signal transmission, and a fourth bidirectional transistor switching means comprising bidirectional transistor structure and having a first terminal coupled to said second keyboard data signal terminal, and having a second, switched terminal coupled to a computer and responsive to said second control signal, for coupling said last named first and second terminals through said last named bidirectional transistor structure, enabling bi-directional data transmission.

7. A keyboard switching system as set forth in claim 6 wherein said first and second bidirectional transistor switching means each comprises a pair of PNP transistors coupled emitter-to-collector, with bases thereof being responsive to said first control signal.

8. A keyboard switching system as set forth in claim 7 wherein said third and fourth bidirectional transistor switching means each comprises a pair of NPN transistors coupled emitter-to-collector, with bases thereof being responsive to said second control signal.

9. A keyboard switching system as set forth in claim 6 wherein said keyboard signal sensing means comprises a latch having a set input responsive to said first keyboard signal, and a reset input responsive to said second keyboard signal, and an output for providing said first and second control signals responsive to sensed said first and second keyboard signals, respectively.

10. A keyboard switching system as set forth in claim 9 comprising switching means having a first terminal coupled to a reset potential and a second, switched terminal coupled to said reset input of said latch, whereby said reset potential is coupled to said reset input, generating said second control signal and applying said second control signal to said third and fourth switching means, enabling said second keyboard for bi-directional signal transmission with said computer.

* * * * *